United States Patent
Takahashi et al.

(10) Patent No.: US 12,346,052 B2
(45) Date of Patent: Jul. 1, 2025

(54) ELECTROPHOTOGRAPHIC ELECTRO-CONDUCTIVE MEMBER, ELECTROPHOTOGRAPHIC IMAGE FORMING APPARATUS, AND PROCESS CARTRIDGE

(71) Applicant: CANON KABUSHIKI KAISHA, Tokyo (JP)

(72) Inventors: Hirobumi Takahashi, Shizuoka (JP); Shota Segawa, Shizuoka (JP); Syoji Inoue, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 668 days.

(21) Appl. No.: 17/655,228

(22) Filed: Mar. 17, 2022

(65) Prior Publication Data

US 2022/0206426 A1 Jun. 30, 2022

Related U.S. Application Data

(63) Continuation of application No. PCT/JP2020/038641, filed on Oct. 13, 2020.

(30) Foreign Application Priority Data

Oct. 18, 2019 (JP) .................................. 2019-191550

(51) Int. Cl.
*G03G 15/00* (2006.01)
*C08L 9/02* (2006.01)

(52) U.S. Cl.
CPC .............. *G03G 15/751* (2013.01); *C08L 9/02* (2013.01)

(58) Field of Classification Search
None
See application file for complete search history.

(56) References Cited

U.S. PATENT DOCUMENTS 4,043,658 A 8/1977 Inoue et al.
4,495,264 A 1/1985 Takahashi et al.
(Continued)

FOREIGN PATENT DOCUMENTS

JP 2002-3651 A 1/2002
JP 2010-211020 A 9/2010
(Continued)

OTHER PUBLICATIONS

Asahi Carbon Datasheet, https://www.asahicarbon.co.jp/global_site/cb/product/data01_physical.pdf (Year: 2024).*
(Continued)

*Primary Examiner* — Mark F. Huff
*Assistant Examiner* — Charles Collins Sullivan, IV
(74) *Attorney, Agent, or Firm* — VENABLE LLP

(57) ABSTRACT

An electro-conductive member for an electrophotographic image forming apparatus for which a change in resistance value is small even when a large current is applied at a high voltage for a long period of time is provided. The electro-conductive member includes a support having an electro-conductive outer surface and an electro-conductive layer on the outer surface of the support, in which the electro-conductive layer has a matrix including a cross-linked product of a first rubber and domains dispersed in the matrix, the domains include a cross-linked product of a second rubber different from the first rubber and an electrically conductive agent, and the cross-linked product of the second rubber has, in a molecule, a structural unit represented by Structural Formula (I).

$$[-(CH_2)_n-O-]$$ Structural Formula (I)

In Structural Formula (I), n is an integer of 1 to 3.

17 Claims, 4 Drawing Sheets

(56) References Cited

U.S. PATENT DOCUMENTS

| | | | |
|---|---|---|---|
| 4,551,404 A | 11/1985 | Hiro et al. | |
| 4,615,963 A | 10/1986 | Matsumoto et al. | |
| 4,615,965 A | 10/1986 | Matsumoto et al. | |
| 4,717,636 A | 1/1988 | Takahashi et al. | |
| 7,171,142 B2 | 1/2007 | Kawakami et al. | |
| 7,195,853 B1 | 3/2007 | Pickering et al. | |
| 9,983,516 B2 | 5/2018 | Takahashi et al. | |
| 10,558,149 B2 | 2/2020 | Takahashi et al. | |
| 2002/0022142 A1* | 2/2002 | Harada | C08K 3/04 428/521 |
| 2011/0013939 A1 | 1/2011 | Ono | |
| 2016/0223952 A1* | 8/2016 | Takahashi | G03G 15/1685 |

FOREIGN PATENT DOCUMENTS

| | | |
|---|---|---|
| JP | 2011-22410 A | 2/2011 |
| JP | 2013-20175 A | 1/2013 |
| JP | 2017-173714 A | 9/2017 |
| JP | 2017-198827 A | 11/2017 |
| JP | 2018-151615 A | 9/2018 |
| JP | 2019-101158 A | 6/2019 |

OTHER PUBLICATIONS

Asahi Carbon Datasheet Translated Selection, translate.google.com (Year: 2024).*
U.S. Appl. No. 17/655,870, Shota Segawa, filed Mar. 22, 2022.

* cited by examiner

ELECTROPHOTOGRAPHIC ELECTRO-CONDUCTIVE MEMBER, ELECTROPHOTOGRAPHIC IMAGE FORMING APPARATUS, AND PROCESS CARTRIDGE

CROSS-REFERENCE TO RELATED APPLICATIONS

This application is a Continuation of International Patent Application No. PCT/JP2020/038641, filed Oct. 13, 2020, which claims the benefit of Japanese Patent Application No. 2019-191550, filed Oct. 18, 2019, both of which are hereby incorporated by reference herein in their entirety.

BACKGROUND

Technical Field

The present disclosure relates to an electrophotographic electro-conductive member, an electrophotographic image forming apparatus, and a process cartridge.

Description of the Related Art

An electrophotographic image forming apparatus (also referred to below as an "electrophotographic apparatus") is usually provided with an image carrier such as a photosensitive member, a charging member which charges the surface of the image carrier, an exposure apparatus which irradiates the surface of the image carrier with light modulated according to image information, a developing member which develops a visible image (toner image) on the image carrier using a developer (toner), and a transfer member which transfers the visible image on the image carrier to a recording material.

For conductive members such as charging members, developing members, and transfer members, medium resistance is desired, thus, a method of using rubber with ion conductivity such as epichlorohydrin rubber and a method of dispersing conductive materials such as carbon black in insulating rubber materials are known.

Japanese Patent Application Laid-Open No. 2002-3651 discloses a rubber composition with a sea-island structure including a polymer continuous phase, which is formed of an ion-conductive rubber material mainly formed of a raw material rubber A having a volume resistivity of $1 \times 10^{12}$ Ω·cm or less, and a polymer particle phase, which is formed of an electrically conductive rubber material in which conductive particles are blended with a raw material rubber B to impart electro-conductivity thereto, as well as a charging member having an elastic layer formed from the rubber composition.

In recent years, there has been a demand for electrophotographic apparatuses to have high speed and a long life and there has also been a demand for electrophotographic members to have performances corresponding to the high speed and long life. In order to increase the speed of electrophotographic apparatuses, the electro-conductive members described above need to transmit large currents at higher voltages. Thus, it is desirable for the electro-conductive members to have a small change in resistance value even when transmitting a large current at a high voltage for a long period of time. However, as disclosed in Japanese Patent Application Laid-Open No. 2002-3651, in a case where a high voltage is continuously applied for a long period of time, an electrophotographic member using carbon black as an electro-conductive material may change in electro-conductivity and the function as an electro-conductive member may change over time.

SUMMARY

One aspect of the present disclosure is directed to providing an electro-conductive member in which the change in resistance value is small even when transmitting a large current at a high voltage for a long period of time.

In addition, another aspect of the present disclosure is directed to providing a process cartridge which contributes to the formation of high quality electrophotographic images. Still another aspect of the present disclosure is directed to providing an electrophotographic image forming apparatus which can form high quality electrophotographic images.

According to one aspect of the present disclosure, there is provided an electrophotographic electro-conductive member including a support having an electro-conductive outer surface, and an electro-conductive layer on the outer surface of the support in which the electro-conductive layer has a matrix including a cross-linked product of a first rubber, and domains dispersed in the matrix, the domains include a cross-linked product of a second rubber different from the first rubber and an electrically conductive agent, and the cross-linked product of the second rubber has, in a molecule, a structural unit represented by Structural Formula (I):

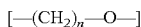

[—(CH$_2$)$_n$—O—]                    Structural Formula (I).

In Structural Formula (I), n is an integer of 1 to 3.

According to another aspect of the present disclosure, there is provided an electrophotographic image forming apparatus including the electro-conductive member described above. According to still another aspect of the present disclosure, there is provided an electrophotographic process cartridge which is attachable to and detachable from a main body of an electrophotographic image forming apparatus, the electrophotographic process cartridge including the electro-conductive member described above.

Further features of the present disclosure will become apparent from the following description of exemplary embodiments with reference to the attached drawings.

DESCRIPTION OF THE EMBODIMENTS

The present inventors speculate that the reason why the electro-conductivity of the electro-conductive member according to Japanese Patent Application Laid-Open No. 2002-3651 changes in a case where a high voltage is continuously applied thereto for a long period of time is as follows. The electro-conductivity resulting from carbon black depends on the degree of development of the carbon black structure.

Here, it is considered that, when the current flowing through the carbon black increases, the carbon black structure changes and the electro-conductivity of the electro-conductive member changes. Therefore, the present inventors considered that, in order to suppress changes in electro-conductivity of conductive members using carbon black as an electro-conductive material when a high voltage is applied thereto, it is effective to suppress the concentration of electric charges on the carbon black, which forms the structure, and to suppress changes in the structure.

As a result of further investigation based on such considerations, it was found that, in a case where the electro-conductive layer provided on the outer surface of the electro-conductive member has the following configuration, changes in the electro-conductivity of the electro-conductive member in a case where a high voltage is continuously applied thereto can be prevented.

A configuration which has a matrix including a cross-linked product of a first rubber and a plurality of domains dispersed in the matrix, in which the domains include a cross-linked product of a second rubber different from the first rubber and an electrically conductive agent, and the cross-linked product of the second rubber has the structural unit represented by Structural Formula (I) in the molecule:

$$[-(CH_2)_n-O-]$$ Structural Formula (I)

(In Structural Formula (I), n is an integer of 1 to 3.)

The electrophotographic electro-conductive member according to one aspect of the present disclosure is described below, using an electro-conductive member with a roller shape (may also be referred to below simply as an "electrophotographic roller") as an example.

Figure 1:
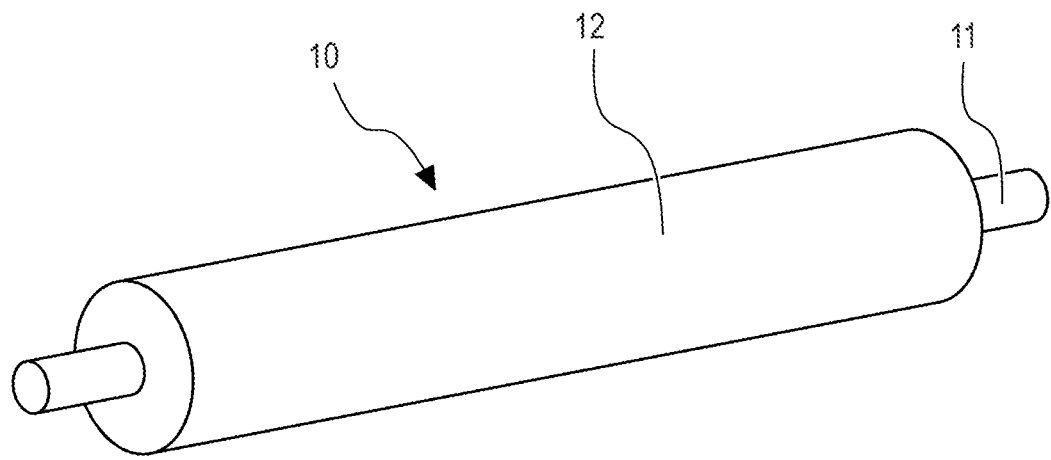
FIG. 1 is a schematic diagram of an electro-conductive member according to one aspect of the present disclosure.

FIG. 1 is an example of an electrophotographic roller according to one aspect of the present disclosure. The electrophotographic roller has an electro-conductive elastic layer (conductive layer) 12 on an outer surface of a cylindrical or columnar support 11 having an electro-conductive outer surface.

[Support 11]

The support 11 supports the electro-conductive layer 12 formed on the support 11. As long as the support 11 has electro-conductivity with the electro-conductive layer 12, there is no particular limitation thereon, but the support 11 is preferably made of a metal such as aluminum, aluminum alloy, stainless steel, or iron. In addition, these metals may be subjected to a plating process with chromium, nickel, or the like to improve corrosion resistance and friction resistance. The shape of the support 11 may be any shape selected from hollow shapes (cylindrical) and solid shapes (columnar). The outer diameter of the cylindrical or columnar support 11 can be selected as appropriate according to the electrophotographic image forming apparatus for installation and examples thereof include 4 mm or more to 10 mm or less.

[Conductive Layer 12]

The outer diameter of the electro-conductive layer can be selected as appropriate according to the electrophotographic image forming apparatus for installation and examples thereof include 7 mm or more to 20 mm or less.

The electro-conductive layer 12 has
a matrix including a cross-linked product of a first rubber and
a plurality of domains dispersed in the matrix,
in which the domains include a cross-linked product of a second rubber different from the first rubber and an electrically conductive agent and the cross-linked product of the second rubber has the structural unit represented by Structural Formula (I) in the molecule.

$$[-(CH_2)_n-O-]$$ Structural Formula (I)

In Structural Formula (I), n is an integer of 1 to 3.

The present inventors estimate that the reason why the electro-conductive member according to the present aspect can prevent changes in electro-conductivity even in a case where a high voltage is continuously applied thereto is as follows.

It is considered that the electrically conductive agent included in the domain is covered by a second rubber cross-linked product having the structural unit represented by Structural Formula (I) in the molecule, which has ion conductivity. When electricity is transmitted in this state, the difference in electrical resistance between the electrically conductive agent and the cross-linked product of the second rubber is small, thus, the electric charge flows to both the electrically conductive agent and the second rubber cross-linked product. Therefore, the concentration of current on the electrically conductive agent can be suppressed. As a result, changes in the electro-conductive path due to the electrically conductive agent are less likely to occur and changes in electro-conductivity can be suppressed. Specifically, for example, in a case where the electrically conductive agent is carbon black, changes in the structure of the carbon black can be suppressed by adopting the configuration described above, thus, changes in electro-conductivity can be prevented.

A volume resistivity ρd of a domain and a volume resistivity ρ of an electro-conductive layer are preferably in the ranges described below.

$$1.0 \times 10^1 \ \Omega \cdot cm \leq \rho d \leq 1.0 \times 10^4 \ \Omega \cdot cm$$

$$1.0 \times 10^5 \ \Omega \cdot cm \leq \rho \leq 1.0 \times 10^8 \ \Omega \cdot cm$$

By the volume resistivity ρd of a domain being $1.0 \times 10^1$ Ω·cm or more, even in portions where the inter-domain distance is locally short, the electric charges can be suppressed from concentrating and flowing. In addition, by the volume resistivity ρd being $1.0 \times 10^4$ Ω·cm or less, the electro-conductivity in the domains is stronger than the ion conductivity, thus, the environmental dependence of the electro-conductivity can be further reduced.

By the volume resistivity ρ of an electro-conductive layer being $1.0 \times 10^5$ Ω·cm or more, even in portions where the inter-domain distance is locally short, the electric charges can be suppressed from concentrating and flowing. In addition, by the volume resistivity ρ being $1.0 \times 10^8$ Ω·cm or less, electric charges can be transmitted without reducing the electro-conductive path even in portions where the inter-domain distance is locally long.

In addition, a volume resistivity ρm of a matrix is preferably in the following range.

$$1.0 \times 10^8 \ \Omega \cdot cm \leq \rho m \leq 1.0 \times 10^{17} \ \Omega \cdot cm$$

By the volume resistivity of a matrix being $1.0 \times 10^8$ Ω·cm or more, resistance changes in the matrix are suppressed by suppressing the electric charges flowing in the matrix. In addition, by the resistivity being $1.0 \times 10^{17}$ Ω·cm or less, electric charges can be transmitted without reducing the electro-conductive path even in portions where the inter-domain distance is locally long.

<Method for Measuring Volume Resistivity ρd of Domain and Volume Resistivity ρm of Matrix>

For example, the volume resistivity ρd of a domain can be measured by cutting out a flake of a predetermined thickness (for example, 1 μm) including the matrix domain structure from the electro-conductive layer and bringing the flake into contact with a micro probe (tip of a cantilever) of a scanning probe microscope (SPM) or an atomic force microscope (AFM) in a domain.

Figure 7:
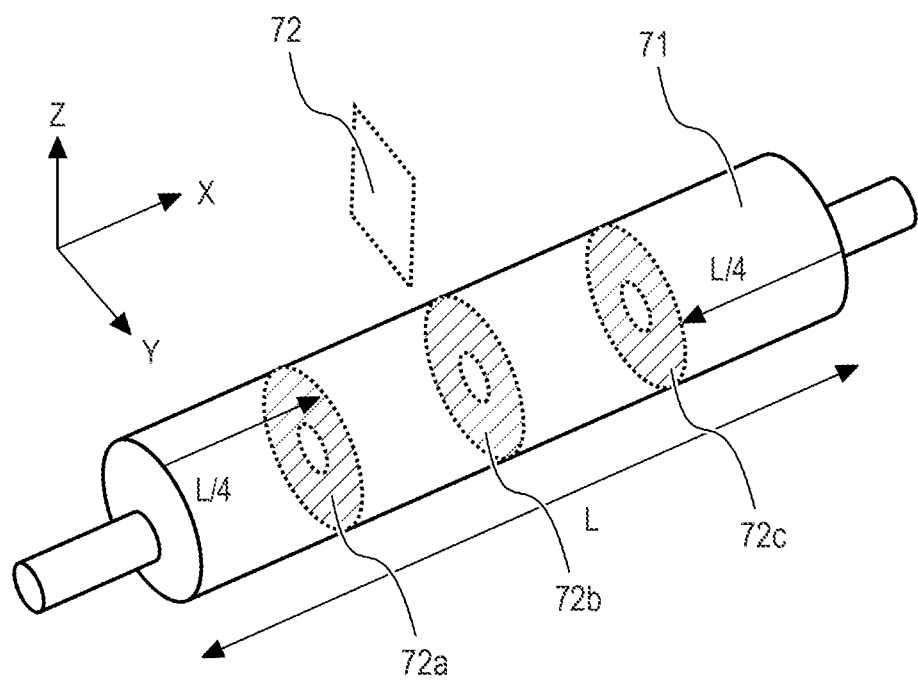
FIG. 7 is a schematic diagram illustrating a cross-section cut out from a piece for domain shape measurement.

For example, for the cutting out of the flake from the elastic layer, in a case where the longitudinal direction of the electro-conductive member is the X-axis, the thickness direction of the electro-conductive layer is the Z-axis, and the circumferential direction is the Y-axis as illustrated in FIG. 7, the flake is cut out to include at least a part of a cross-section parallel to the XZ plane. Alternatively, for example, as illustrated in FIG. 7, the flake is cut out so as to include at least a part of a YZ plane 72 (for example, cross-sections 72a, 72b, and 72c) orthogonal to the axial direction of the electro-conductive member. Examples of the cutting out of the flake from the elastic layer include a method using a sharp razor or microtome, a focused ion beam (FIB) method, or the like.

The volume resistivity measurement is performed by the following method. First, one surface of a flake cut out from the electro-conductive layer is grounded. Next, a micro probe of a scanning probe microscope (SPM) or an atomic force microscope (AFM) is brought into contact with a portion of the domain on the surface on the opposite side to the ground surface of the flake, a DC voltage of 1 V is applied thereto for 5 seconds, the arithmetic mean value is calculated from a value obtained by measuring the ground current value for 5 seconds, and the applied voltage is divided by the calculated value to calculate the electrical resistance value. Since an SPM and an AFM can also measure the film thickness of a flake at the same time as the resistance value, the film thickness of the flake is used to convert the resistance value into the volume resistivity.

The value of the volume resistivity of a domain in a columnar charging member is determined, for example, by dividing the electro-conductive layer into four sections in the circumferential direction and five sections in the longitudinal direction, cutting out one flake sample from each region, and then calculating the arithmetic mean value of the volume resistivities of a total of 20 samples after obtaining the measurement values described above.

The measurement of the volume resistivity ρm of a matrix may also be carried out in the same manner as the measurement of the volume resistivity of a domain and by the same method, except that the measurement points are changed to locations corresponding to the matrix and the applied voltage is changed to 50 V when measuring the current value.

<Domain Shape>

By making the cross-sectional shape of the domains appearing in the cross-section in the thickness direction of the electro-conductive layer closer to a circular shape, electric field concentration caused by the convex shape of the electro-conductive domains can be minimized. Therefore, even in a case where a high voltage is applied to the electro-conductive member, excessive electric charge transfer is suppressed and the photosensitive member can be charged more uniformly. As a result, the generation of fogging on electrophotographic images can be suppressed.

The cross-sectional shape of the domain (referred to below simply as domain shape) in the present disclosure is defined as follows. When the longitudinal length of the electro-conductive layer is denoted by L and the thickness of the electro-conductive layer is denoted by T, as illustrated in FIG. 7, for each of the cross-sections 72a, 72b, and 72c in the thickness direction of the electro-conductive layer 71 at a total of three locations, which are the center of the electro-conductive layer in the longitudinal direction and two locations at L/4 from both ends of the electro-conductive layer toward the center, 15 μm square observation regions are placed at three arbitrary locations in the thickness region from the outer surface of the electro-conductive layer to a depth of 0.1 T to 0.9 T and the shapes of domains observed at each of a total of nine observation regions are used. The cross-sections 72a, 72b, and 72c are cross-sections in a direction parallel to the YZ plane 72, with the axial direction of the support being the X direction and the directions perpendicular to the X direction being the Y direction and Z direction.

For the domain according to the present aspect, the cross-sectional shape appearing in the cross-section of the electro-conductive layer in the thickness direction is preferably closer to circular. Specifically, when a 15 μm square observation region is placed at an arbitrary position in the cross-section in the thickness direction of the electro-conductive layer, it is preferable that 80% or more of the number of the domains observed in the observation region satisfy Equation (1) and Equation (2).

$$0.60 \leq 4 \times S/(\pi \times D_f^2) \leq 1.00 \qquad \text{Equation (1)}$$

(In Equation (1), $D_f$ is the maximum Feret diameter of the cross-section of the domain and S is the area of the cross-section of the domain.)

$$1.00 \leq A/B \leq 1.10 \qquad \text{Equation (2)}$$

(In Equation (2), A is the perimeter of the cross-section of the domain and B is the envelope perimeter of the cross-section of the domain.)

Figure 4:
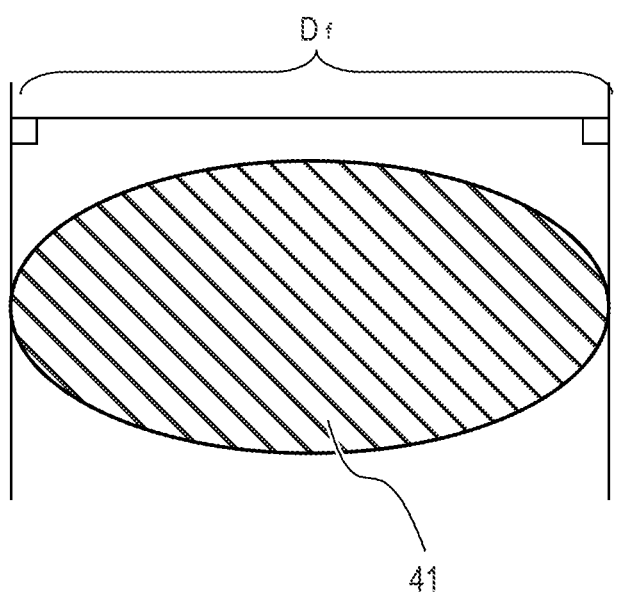
FIG. 4 is a conceptual diagram illustrating the maximum Feret diameter of a domain.

As illustrated in FIG. 4, when the outer circumference of the observed cross-section 41 of the domain is interposed between two parallel lines and the gap between the two parallel lines is connected by a perpendicular line, the maximum Feret diameter $D_f$ in Equation (1) is the value when the perpendicular line is the longest. Equation (1) indicates the area ratio of the actual area S of the cross-section of the domain with respect to the circle corresponding to the maximum Feret diameter determined from the cross-section of the domain. The maximum value of this ratio is 1.00 and a state where the ratio is 1.00 indicates that the cross-section of the domain is a perfect circle. When the ratio is less than 0.60, the shape of the domain has a large anisotropy and electric field concentration is easily generated at the end portions of the domain in the longitudinal direction.

Figure 5:
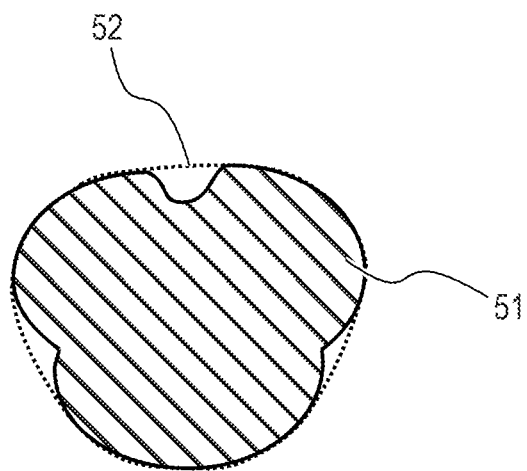
FIG. 5 is a conceptual diagram illustrating the envelope perimeter of a domain.

Equation (2) indicates the ratio between the circumference length of the cross-section of the domain and the envelope perimeter of the cross-section of the domain. The envelope perimeter is defined as the perimeter of the convex hull of the domain. Specifically, as illustrated in FIG. 5, the envelope perimeter is the perimeter (dashed line 52) when the convex portions of the cross-section 51 of the domain observed in the observation region are connected to each other and the circumference lengths of the concave portions are ignored.

The minimum value of the ratio of a perimeter A of the cross-section of the domain in Equation (2) to an envelope perimeter B of the cross-section of the domain is 1.00 and a state of 1.00 indicates that the cross-section of the domain is a perfect circle or ellipse. When the ratio exceeds 1.10, a highly irregular shape is present in the domain, that is, electric field concentration is easily generated. In a case where Equation (2) is satisfied, the electric field concentration is suppressed, thus, fogging can be suppressed.

The size of the domains in the present aspect is preferably within a certain range and the maximum Feret diameter, which is an index representing the domain size, is preferably 0.1 μm or more to 5.0 μm or less. When the maximum Feret diameter is within this range, the cross-sectional shape that appears in the cross-section of the electro-conductive layer of the domain shape in the thickness direction is more likely to be circular. As a result, fogging is reduced and the discharge becomes finer due to the finer conductive domains such that the image quality can be increased.

In the present aspect, it is more preferable to have an average of 20 to 300 domains present in a 15 μm square observation region. When there are 20 or more domains present, sufficient electro-conductivity as an electro-conductive member can be obtained and a sufficient electric charge supply can be achieved even in high-speed processes. In addition, when there are 300 or fewer domains present, a sufficient inter-domain distance can be maintained and the aggregation of domains due to repeated image output can be suppressed, thus, it is easier to achieve uniform discharge even in long-term use.

In addition, in the present aspect, when carbon black is included in the domains as an electrically conductive agent, it is preferable that 80% or more of the number of the domains observed in each of the total of nine observation regions described above satisfy Requirement (1) and Requirement (2).

Requirement (1): The ratio of a cross-sectional area of carbon black included in the domain with respect to the cross-sectional area of the domain is 20% or more;

Requirement (2): When the perimeter of the domain is denoted by A and the envelope perimeter of the domain is denoted by B, A/B is 1.00 or more to 1.10 or less.

Requirement (2) has the same meaning as Equation (2) above.

Regarding Requirement (1), the present inventors obtained the finding that the amount of the electrically conductive agent (carbon black particles) included in one domain influences the external shape of the domain. That is, it was found that, as the filler amount of carbon black particles in a single domain increased, the shape of the domain became closer to a sphere. The greater the number of domains that are close to being a sphere, the more the concentration points of electron transfer between domains can be reduced. Although the reason is not clear, according to the investigation by the present inventors, the domains where the ratio of the total cross-sectional area of carbon black particles observed in the cross-section of one domain is 20% or more based on the area of the cross-section of one domain can take a shape closer to a sphere. As a result, an external shape can be taken which can significantly alleviate the concentration of electron transfer between domains, which is preferable. When considering the retention of carbon black particles in the domains, the ratio of the cross-sectional area of carbon black particles is preferably 40% or less and more preferably 30% or less.

[Conductive Layer Composition]

The electro-conductive layer 12 has a matrix including a cross-linked product of a first rubber and a plurality of domains dispersed in the matrix, in which the domains include a cross-linked product of a second rubber different from the first rubber and an electrically conductive agent and the cross-linked product of the second rubber has the structural unit represented by Structural Formula (I) in the molecule.

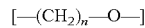
 Structural Formula (I)

In Structural Formula (I), n is an integer of 1 to 3.

Examples of electrically conductive agents to be blended into the domain include carbon materials such as carbon black and graphite; conductive oxides such as titanium oxide and tin oxide; metals such as Cu and Ag; particles with conductive oxides or metals coated on the surface thereof to impart electro-conductivity thereto. In addition, as necessary, two or more types of these electrically conductive agents may be blended in combination as appropriate.

Among the electrically conductive agents described above, an electrically conductive agent formed mainly of conductive carbon black is preferable for reasons of suppression of significant reduction in rubber elasticity, high electro-conductivity efficiency, good affinity with rubber, easy control of the distance between electrically conductive agents, and the like. The type of conductive carbon black is not particularly limited and specific examples thereof include gas furnace black, oil furnace black, thermal black, lamp black, and acetylene black.

In the following description, the rubber components in the uncross-linked composition are referred to as "first rubber" and "second rubber" and the cross-linked components are referred to as "first rubber cross-linked product" and "second rubber cross-linked product", respectively.

The second rubber preferably includes 50 mol % to 98 mol % of the structural unit represented by Structural Formula (I) and more preferably includes 50 mol % to 75 mol %. When the second rubber includes 50 mol % or more of the structural unit represented by Structural Formula (I), sufficient ion conductivity is obtained as a polymer, electric charge concentration on the electrically conductive agent is suppressed, and the effect of degradation suppression is increased. In addition, the second rubber including 98 mol % or less and more preferably 75 mol % or less of the structural unit represented by Structural Formula (I) makes the affinity with the matrix excellent and enables fine dispersion of the domains.

The second rubber preferably has a structural unit derived from allyl glycidyl ether (AGE) and the ratio of the number of structural units derived from allyl glycidyl ether is more preferably 2 mol % to 15 mol %. By the ratio of the number of allyl glycidyl ether-derived structural units being 2 mol % or more, the cross-linking is appropriately carried out by sulfur cross-linking and it is difficult for deformation to occur as an electro-conductive layer. In addition, by the ratio being 15 mol % or less, the number of double bonds remaining without sulfur cross-linking is small and it is difficult for the electro-conductivity to deteriorate due to denaturation of the rubber by the electric current passing through the rubber.

Furthermore, the second rubber is preferably an epichlorohydrin-alkylene oxide-allyl glycidyl ether ternary copolymer. This is because the presence of epichlorohydrin-derived structural units makes it even more difficult for the rubber to be denatured by the electric current passing through the rubber.

Furthermore, it is preferable to include one or both of an ethylene oxide structural unit (n=2) and a propylene oxide structural unit (n=3) as the structural unit represented by Structural Formula (I). By including one or both of the ethylene oxide structural unit and the propylene oxide structural unit as the structural unit indicated in Structural Formula (I), the second rubber can obtain better ion conductivity.

The carbon black as the electrically conductive agent in the domain preferably has a DBP absorption amount of 40 $cm^3/100$ g or more to 200 $cm^3/100$ g or less. The DBP absorption amount contributes greatly to the electro-conductivity of carbon black and, when the DBP absorption amount is 40 $cm^3/100$ g or more, the electro-conductivity is developed when mixed with the second rubber and it is easy to suppress resistivity fluctuations due to the environment. The DBP absorption amount being 200 $cm^3/100$ g or less makes the balance good between the electro-conductivity of carbon black and the ion conductivity of the second rubber and reduces changes in the resistance due to the electric current passing through the rubber.

The DBP absorption amount ($cm^3/100$ g) is the volume of dibutyl phthalate (DBP) that 100 g of carbon black can absorb and is measured according to Japanese Industrial Standard (JIS) K 6217-4:2017 (Carbon black for rubber—Basic properties—Part 4: Determination of Oil Absorption Amount (including compressed samples)). In general, carbon black has a tufted higher-order structure in which primary particles with an average particle diameter of 10 nm or more to 50 nm or less are aggregated. This tufted higher-order structure is called the structure and the degree thereof is quantified by DBP absorption amount ($cm^3/100$ g).

The first rubber which forms the matrix may be any rubber which can be phase-separated from the second rubber and form a matrix-domain structure and is not particularly limited.

Preferable examples of the first rubber as described above include natural rubber (NR), isoprene rubber (IR), butadiene rubber (BR), styrene-butadiene rubber (SBR), butyl rubber (IIR), ethylene-propylene rubber (EPM), ethylene-propylene-diene ternary copolymerized rubber (EPDM), chloroprene rubber (CR), acrylonitrile-butadiene rubber (NBR), hydrogenated NBR (H-NBR), silicone rubber, and the like.

In addition, in order to make the shape of the domains appearing in the cross-section of the electro-conductive layer in the thickness direction close to circular and to reduce the Feret diameter, the SP value difference between the first rubber and the second rubber is preferably in an appropriate range. A material with an SP value difference of 0.4 $(J/cm^3)^{0.5}$ or more to 2.2 $(J/cm^3)^{0.5}$ or less is preferable. By the SP value difference being 0.4 $(J/cm^3)^{0.5}$ or more, a stable phase-separated structure can be formed with the first rubber and the second rubber. By the SP value difference being 2.2 $(Fcm^3)^{0.5}$ or less, the Feret diameter of the domain can be reduced. In order to set the SP value difference with the second rubber in the appropriate range described above, acrylonitrile-butadiene rubber (NBR) is preferable as the type of the first rubber. Among the above, it is more preferable that the content ratio of acrylonitrile (AN) in the NBR cross-linked product is 15% by mass or more to 25% by mass or less. When the content ratio of AN is 15% by mass or more, the resistance value is not excessively high, and, when 25% by mass or less, an appropriate butadiene content can be secured to obtain a sufficient degree of cross-linking by vulcanization.

The content of the electrically conductive agent such as carbon black in the matrix is preferably 10% by mass or less and it is more preferable that substantially no electrically conductive agent (0% by mass) is included in the matrix. Substantially no electrically conductive agent being included in the matrix suppresses the electro-conductivity of the matrix and enables the forming of conductive paths using the domains.

The rubber composition further includes sulfur for cross-linking (sulfur vulcanization). The sulfur content can be appropriately determined according to the degree of cross-linking or the like without being particularly limited; however, as a guide, for example, 1.0% by mass to 4.0% by mass with respect to the total amount of the rubber composition is preferable.

The rubber composition used to form the electro-conductive layer 12 may, as necessary, include rubber components other than the first rubber and the second rubber, vulcanization aids, foaming agents, vulcanization accelerators, and other additives. However, with respect to the total content of the rubber components in the rubber composition, the content ratio of the first rubber and the second rubber is preferably 95% by mass or more and more preferably 98% by mass or more. Furthermore, the rubber components in the rubber composition are particularly preferably formed of only the first rubber and the second rubber, excluding impurities.

[Vulcanization Aid]

Examples of vulcanization aids that may be contained in the rubber composition used to form the electro-conductive layer 12 include zinc oxide, zinc stearate, stearic acid, and the like.

[Foaming Agent]

Examples of foaming agent components that may be contained in the rubber composition used to form the electro-conductive layer 12 include azodicarbonamide, sodium hydrogencarbonate, p,p'-oxybis(benzenesulfonylhydrazide) (OBSH), and the like.

[Vulcanization Accelerator]

Examples of vulcanization accelerators that may be contained in the rubber composition used to form the electro-conductive layer 12 include thiuram-based, thiazole-based, guanidine-based, sulfenamide-based, dithiocarbamate-based, and thiourea-based vulcanization accelerators, and the like.

[Other Additives]

In addition, others such as silica and calcium carbonate may be contained in a range of not interfering with the functions of the essential components included in the rubber composition used to form the electro-conductive layer 12 described above.

[Method for Manufacturing Electro-Conductive Member]

An example of a method for manufacturing an electro-conductive member according to the present aspect is illustrated below. In this example, the manufacturing method includes the following steps (A) to (C), but is not particularly limited within a range in which the configuration of the present aspect can be achieved.

(A) A step of preparing an electrically conductive agent master batch (CMB) for forming domains, including carbon black and rubber;

(B) a step of preparing a rubber composition for forming a matrix (MRC); and (C) a step of kneading the CMB and the MRC to prepare a rubber composition having a matrix-domain structure.

First, the second rubber to be the domain, the electrically conductive agent, and additives as necessary are kneaded using a closed-type kneading machine such as a Banbury mixer or a kneader. Thereafter, the obtained mixture, the first rubber, and, as necessary, vulcanization aids and additives are further kneaded using a closed-type kneading machine such as a Banbury mixer or kneader. Furthermore, using open rolls, sulfur, vulcanization accelerators, foaming agents, and the like as necessary are added to the kneaded material and kneaded. Thereafter, the kneaded material is formed into ribbon shapes using a ribbon forming and extruding machine.

Figure 2:
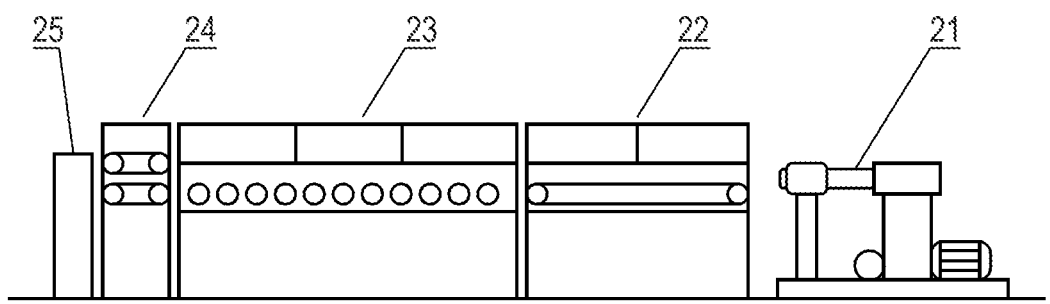
FIG. 2 is an example of an apparatus which can be used to form a rubber tube (an electro-conductive layer). The apparatus includes an extruder, a microwave vulcanization apparatus, a hot air vulcanization apparatus, a take-up machine, and a fixed length cutting machine.
Figure 3:
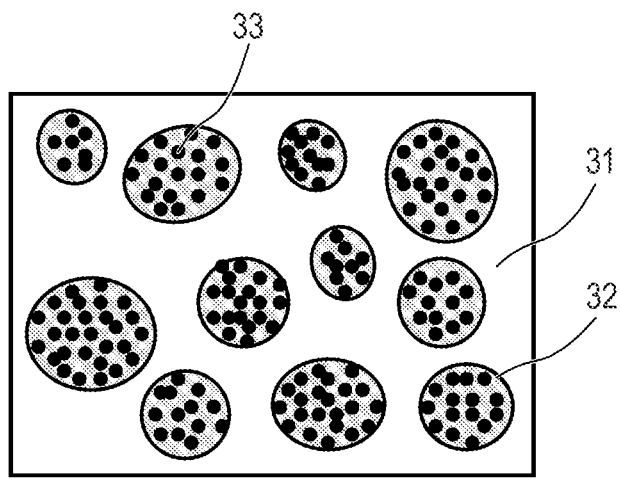
FIG. 3 is a schematic diagram of a matrix-domain structure according to one aspect of the present disclosure.

Next, a rubber tube, which is to be the electro-conductive layer, is formed in a rubber tube forming apparatus formed of an extruder 21, a microwave vulcanization apparatus 22, a hot air vulcanization apparatus 23, a take-up machine 24, and a fixed length cutting machine 25 as illustrated in FIG. 2.

First, the obtained ribbon-shaped formed material is introduced into the extruder 21 to extrude the rubber tube.

Next, the obtained rubber tube is vulcanized and foamed as necessary. The vulcanizing and foaming can be performed using a known means such as a microwave vulcanization apparatus, a hot air vulcanization apparatus, an electric furnace, a vulcanizer, or the like. Among the above, when considering the production cost due to the heating efficiency of the rubber, it is more preferable to perform the vulcanizing and foaming using a microwave vulcanization apparatus. When vulcanizing and foaming are performed by a vulcanization apparatus including the microwave vulcanization apparatus 22, uniform heat conduction to the rubber tube can be carried out, thus, it is easy to obtain the desired conductive layer according to the material characteristics. In addition, after vulcanizing and foaming using the microwave vulcanization apparatus 22, it is preferable to further vulcanize and foam using the hot air vulcanization apparatus 23.

The vulcanized and foamed rubber tube is transported from the inside of the microwave vulcanization apparatus 22 and the hot air vulcanization apparatus 23 by the take-up machine 24 and is cut to the desired dimensions by the fixed length cutting machine 25. The rubber tube may be subjected to a cooling step before or after the cutting.

The support is press-fitted into a hollow portion of the rubber tube obtained in this manner. The method for fixing the rubber tube and the substrate can be appropriately selected, such as a method for applying an electro-conductive adhesive on the support, or a method for press-fitting a substrate having an outer diameter larger than the inner diameter of the rubber tube. Furthermore, after press-fitting the substrate, both end portions of the rubber tube may be cut to the desired length as necessary. Usually, the length of the support is set to be greater than the length of the rubber tube and a part of the support 11 is in a state of being exposed from both ends of the electro-conductive layer 12 (rubber tube) as illustrated in FIG. 1. The rubber tube into which the support is press-fitted is polished by a polishing machine and an electro-conductive member 10 having the electro-conductive layer 12 on the support 11 is produced.

[Electrophotographic Image Forming Apparatus]

An electrophotographic image forming apparatus according to one aspect of the present disclosure has an electrophotographic photosensitive member, a transfer member arranged in contact with the electrophotographic photosensitive member, a charging member arranged to enable charging of the electrophotographic photosensitive member, and a developing member arranged in contact with the electrophotographic photosensitive member. The electro-conductive member according to one aspect of the present disclosure can be used as a member for which an elastic conductive layer is demanded, for example, a transfer member, a charging member, and a developing member.

Here, an example of an electrophotographic image forming apparatus in which the electro-conductive member described above is applied as a transfer member will be described in detail below.

Figure 6:
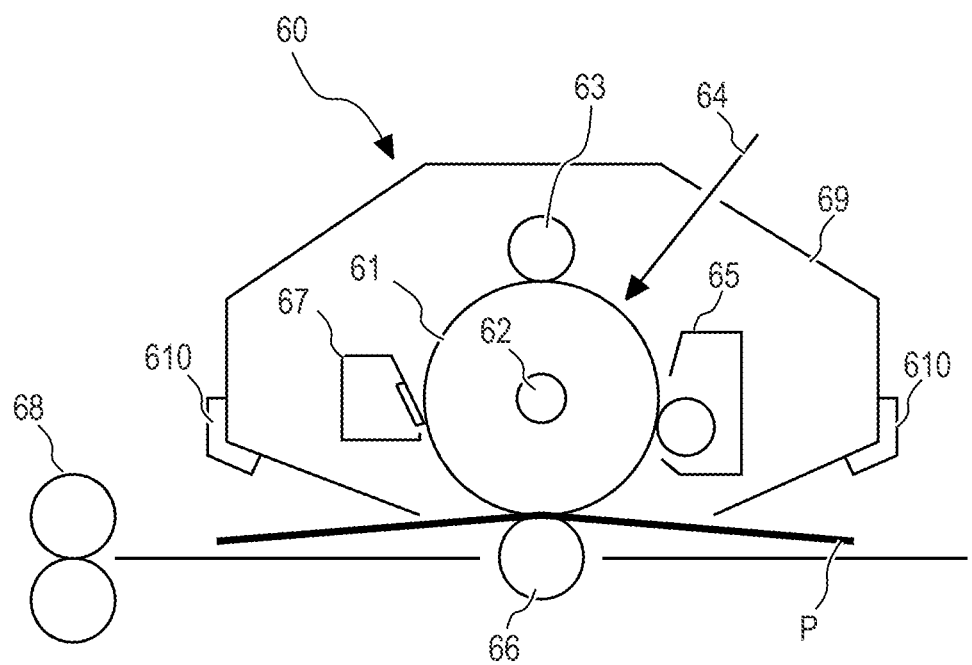
FIG. 6 is a schematic configuration diagram of an electrophotographic image forming apparatus according to one aspect of the present disclosure.

FIG. 6 is a schematic configuration diagram of an electrophotographic image forming apparatus according to one aspect of the present disclosure.

In FIG. 6, a cylindrical electrophotographic photosensitive member 61 is rotatably driven with a predetermined peripheral speed in a clockwise direction around an axis 62. The surface of the electrophotographic photosensitive member 61 being rotatably driven is uniformly charged to a predetermined positive or negative potential by a charging member 63 such as a charging roller during the rotation process. Next, the surface of the charged electrophotographic photosensitive member 61 is exposed to an intensity-modulated exposure light 64 corresponding to a time-series electrical digital image signal of target image information output from an exposure means (not illustrated), using slit exposure or laser beam scanning exposure. In this manner, an electrostatic latent image corresponding to the target image is sequentially formed on the surface of the electrophotographic photosensitive member 61.

The electrostatic latent image formed on the surface of the electrophotographic photosensitive member 61 is developed by the toner included in the developer in the developing member 65 by regular development or inversion development to form a toner image. Next, the toner image formed and carried on the surface of the electrophotographic photosensitive member 61 is sequentially transferred to a transfer material P such as paper by the transfer bias from the transfer member 66, which is a transfer member having the electro-conductive member described above. The transfer material P is taken out from the transfer material supply member (not illustrated) in synchronization with the rotation of the electrophotographic photosensitive member 61 and fed between (at the contact portion) the electrophotographic photosensitive member 61 and the transfer member 66. In addition, a bias voltage of the opposite polarity to that of the electric charge held by the toner is applied to the transfer member 66 from a bias power source (not illustrated).

The transfer material P to which the toner image is transferred is separated from the surface of the electrophotographic photosensitive member 61, transported into the fixing member 68 to undergo a toner image fixing process, and transported outside the apparatus as an article on which an image is formed (a print or a copy).

After the toner image is transferred, the surface of the electrophotographic photosensitive member 61 is cleaned by removing the developer (transfer residual toner) remaining from the transfer with a cleaning member 67 such as a cleaning blade. A cleaner-less system in which the transfer residual toner is directly removed by the developing device or the like can also be applied.

Next, a static electricity elimination process is carried out by a pre-exposure light (not illustrated) from a pre-exposure means (not illustrated) and then the above processes are used for image formation repeatedly. As illustrated in FIG. 6, in a case where the charging member 63 is a contact charging member using a charging roller or the like, pre-exposure is not necessarily required.

From among components such as the electrophotographic photosensitive member 61, the charging member 63, the developing member 65, and the cleaning member 67 described above, a plurality of components including at least the electrophotographic photosensitive member 61 may be selected and configured as a process cartridge by being placed in a container and integrally supported. The process cartridge may be configured to be freely attachable to and detachable from the main body of an electrophotographic image forming apparatus such as a copier or a laser beam printer. In FIG. 6, the electrophotographic photosensitive member 61, the charging member 63, the developing member 65, and the cleaning member 67 are integrally supported to be made into a cartridge. A process cartridge 69 is attachable to and detachable from the main body of the electrophotographic image forming apparatus using a guide member 610 such as a rail in the main body of the electrophotographic image forming apparatus 60. In the case of a process cartridge, the electro-conductive member according to the present aspect can be applied to a charging member and a developing member. Although the electrophotographic image forming apparatus illustrated in FIG. 6 has a cleaning member 67 and a fixing member 68, these members may not necessarily be provided.

The exposure light 64 is, for example, reflected light or transmitted light from a document in a case where the electrophotographic image forming apparatus 60 is a copier or printer. Alternatively, the exposure light 64 is light which is irradiated by scanning with a laser beam, driving an LED array, driving a liquid crystal shutter array, or the like, which are performed according to a signal obtained by reading and converting a document to a signal with a sensor.

In a case where the electro-conductive member according to the present aspect is used as a transfer member (transfer roller), toner scattering on the image caused by abnormal discharge can be suppressed. In addition, in a case where the electro-conductive member according to the present aspect is used as a charging member (charging roller), fogging of the image caused by abnormal discharge can be suppressed.

EXAMPLES

Next, the present disclosure will be described in more detail as an example of an electro-conductive member, using a transfer member as an example; however, the present disclosure is not limited thereto.

First, the materials described in Table 1 were prepared as the first rubber, the second rubber, and the electrically conductive agent.

TABLE 1

| Component | No. | |
|---|---|---|
| First rubber | R1-1 | "Nipol DN401LL" (product name; manufactured by Japan Zeon) AN amount 18% by mass acrylonitrilebutadiene rubber |
| | R1-2 | "Nipol DN302" (product name; manufactured by Japan Zeon) AN amount 28% by mass acrylonitrilebutadiene rubber |
| | R1-3 | "Tufdene T2003" (product name; manufactured by Asahi Kasei) Styrenebutadiene rubber |
| | R1-4 | "Esprene 505A" (product name; manufactured by Sumitomo Chemical) EPDM |
| Second rubber | R2-1 | "Epichlomer CG102" (product name; manufactured by Osaka Soda Co., Ltd.) Ethylene oxide amount 56 mol % AGE amount 4 mol % epichlorohydrin/ethylene oxide/allyl glycidyl ether terpolymer |
| | R2-2 | "Epion 301" (product name; manufactured by Osaka Soda Co., Ltd.) Ethylene oxide amount 74 mol % AGE amount 4 mol % epichlorohydrin/ethylene oxide/allyl glycidyl ether terpolymer |

TABLE 1-continued

| Component | No. | |
|---|---|---|
| | R2-3 | "Epichlomer-C" (product name; manufactured by Osaka Soda Co., Ltd.) Ethylene oxide amount 50 mol % epichlorohydrin/ethylene oxide binary copolymer |
| | R2-4 | "ZEOSPAN 8030" (product name; manufactured by Japan Zeon) Ethylene oxide + propylene oxide amount 96 mol % AGE amount 4 mol % ethylene oxide/propylene oxide/allyl glycidyl ether terpolymer |
| Electrically conductive agent | C-1 | "Asahi #70" (product name; manufactured by Asahi Carbon) DBP absorption oil amount 101 cm$^3$/100 g |
| | C-2 | "Toka Black #7270SB" (product name; manufactured by Tokai Carbon) DBP absorbing oil amount 62 cm$^3$/100 g |
| | C-3 | "Toka Black #5500" (product name; manufactured by Toka Carbon) DBP absorbing oil amount 155 cm$^3$/100 g |
| | C-4 | "Ketjen Black EC600JD" (product name; manufactured by Lion Specialty Chemicals Co., Ltd.) DBP absorbing oil amount 495 cm$^3$/100 g |
| | C-5 | "S-2000" (product name; manufactured by Mitsubishi Materials Electronic Chemicals Co., Ltd.) Tin-based oxide |

In addition, the materials described in Table 2 were also prepared as vulcanization aids, fillers, vulcanization agents, foaming agents, and vulcanization accelerators.

TABLE 2

| No. | Material type/Product name |
|---|---|
| Vulcanization aid No. 1 | Zinc oxide (product name: Zinc oxide two types; manufactured by Sakai Chemical Industry Co., Ltd.) |
| Vulcanization agent No. 1 | Sulfur (product name: Sulfax PMC; manufactured by Tsurumi Chemical Industry Co., Ltd.) |
| Foaming agent No. 1 | 4,4'-oxybis(benzenesulfonylhydrazide) (product name: Neocellborn N #1000M; manufactured by Eiwa Chemical Ind. Co., Ltd.) |
| Vulcanization acceleration No. 1 | Di-2-benzothiazolyldisulfide (product name: Nocceler DM-P; manufactured by Ouchi Shinko Chemical Industries Co. Ltd.) |
| Vulcanization acceleration No. 2 | Tetraethylthiuram disulfide (product name: Nocceler TET-G; manufactured by Ouchi Shinko Chemical Industries Co. Ltd.) |

Example I-1

1. Preparation of Rubber Composition

[1-1. Preparation of Electrically Conductive Agent Master Batch (CMB) 1 for Forming Domain]

The materials of material prescription (1) described below were mixed.

(Material Prescription (1))

Second rubber (R2-1): 30 parts by mass

Electrically conductive agent (C-1): 25 parts by mass

Vulcanization aid No. 1: 1.5 parts by mass

The obtained mixture was introduced into a sealed-type kneader (apparatus name: WDS7-30, manufactured by Nihon Spindle Manufacturing Co., Ltd.) having a capacity of 7 L and kneaded at a rotor speed of 30 rpm for 16 minutes to obtain CMB 1.

[1-2. Preparation of Rubber Composition for Forming Matrix (MRC) 1]

In the same manner, the materials of material prescription (2) described below were mixed.

(Material Prescription (2))
  First rubber (R1-1): 70 parts by mass
  Vulcanization aid No. 1: 3.5 parts by mass The obtained mixture was introduced into a sealed-type kneader (apparatus name: WDS7-30, manufactured by Nihon Spindle Manufacturing Co., Ltd.) having a capacity of 7 L and kneaded at a rotor speed of 30 rpm for 16 minutes to obtain MRC 1.

The materials of the material prescription (3) described below were mixed.

(Material Prescription (3))
  CMB 1: 56.5 parts by mass
  MRC 1: 73.5 parts by mass
  Foaming agent No. 1: 2.5 parts by mass
  Vulcanization accelerator No. 1: 1.5 parts by mass
  Vulcanization accelerator No. 2: 2.0 parts by mass
  Vulcanization agent No. 1: 3.0 parts by mass The obtained mixture was introduced into an open roll (apparatus name: 12-inch open roll, manufactured by Kansai Roll Co., Ltd.) and kneaded and dispersed for 15 minutes while cooling to maintain the temperature of the mixture at 80° C. or lower. Finally, the mixture was shaped into ribbon shapes and a rubber composition for an electro-conductive layer was prepared.

2. Production of Conductive Member

Using the manufacturing apparatus illustrated in FIG. 2, the rubber tube to be the electro-conductive layer was produced. First, the rubber composition for an electro-conductive layer prepared above was supplied to a vent-type rubber extruder 21 (apparatus name: 60 mm single-screw vent-type rubber extruder, manufactured by Mitsuba Corporation) and extruded into a tube form. Next, using a vulcanization apparatus (apparatus name: 3.0 kJ/s (3.0 kW) microwave continuous rubber vulcanization line, manufactured by Micro Denshi Co., Ltd.) including the microwave vulcanization apparatus 22, the tube-form extruded product was vulcanized and foamed to produce a rubber tube. The microwave vulcanization apparatus was set at a frequency of 2450±50 MHz and an output of 1.0 kJ/s (1.0 kW) and the temperature in the furnace was set to 200° C. After vulcanizing and foaming in the microwave vulcanization apparatus, the rubber tube was further vulcanized and foamed in the hot air vulcanization apparatus 23 with the furnace temperature set at 200° C. The outer diameter of the tube after vulcanizing and foaming was 15.0 mm and the inner diameter was 4.0 mm. The rubber tube was transported at a speed of 2.0 m/min in the microwave vulcanization apparatus and the hot air vulcanization apparatus by the take-up machine 24. After vulcanizing and foaming, the surface temperature of the rubber tube was cooled to 100° C. or lower by cold air and then the rubber tube was cut to a length of 230 mm by the fixed length cutting machine 25.

Next, after press-fitting a stainless-steel support of 240 mm in length with an outer diameter of 5 mm into the hollow portion of the rubber tube, both end portions of the rubber tube were cut to obtain a roller with a rubber length of 216 mm. The outer circumferential surface of the roller was polished to an outer diameter of 12.5 mm at a rotational speed of 1800 rpm and a feed rate of 800 mm/min with a polishing grinding wheel and the electro-conductive member I-1 having an electro-conductive layer on the outer circumference of the support was produced.

3. Characteristic Evaluation

<3-1. Measurement of Volume Resistivity of Matrix>

First, using a microtome (product name: Leica EM FCS, manufactured by Leica Microsystems), pieces of approximately 2 μm in thickness were cut out from the electro-conductive layer of the electro-conductive member I-1 at a cutting temperature of −100° C. For these pieces, the longitudinal length of the electro-conductive layer of the electro-conductive member I-1 was denoted by L and samples including the full thickness portion of the electro-conductive layer were cut out from a total of three cross-sections perpendicular to the longitudinal direction at the center of the longitudinal direction of the electro-conductive layer and L/4 positions from both ends of the electro-conductive layer toward the center. Platinum was deposited on the surface of the obtained samples corresponding to the cross-sections of the electro-conductive layer. Next, using a scanning electron microscope (SEM) (product name: S-4800, manufactured by Hitachi High-Technologies Corporation), the platinum-deposited surfaces were imaged at a magnification of 5,000 times to obtain SEM images. From these SEM images, it was confirmed that the electro-conductive layer formed a matrix-domain structure and that carbon black was present in the domains. For the electro-conductive members according to the other Examples, the presence of the matrix-domain structure and the presence of carbon black in the domains was also confirmed in the same manner as described above.

In addition, the volume resistivity of a matrix was measured using a scanning probe microscope (SPM) (product name: Q-Scope 250, manufactured by Quesant Instrument Corporation) in contact mode as follows. The measurement environment was set at a temperature of 23° C. and a relative humidity of 50%.

First, a sample was cut out from the electro-conductive layer in the same manner as described above. Next, the sample was placed on a metal plate such that one surface of the sample, corresponding to the cross-section of the electro-conductive layer, was in contact with the surface of the metal plate. Then, the cantilever of the SPM was brought into contact with a location corresponding to the matrix within the surface on the opposite side to the surface in contact with the surface of the metal plate of the sample. Next, a voltage of 50 V was applied to the cantilever and the current value was measured.

The surface shape of the measured piece was observed by SPM and the thickness of the measurement point was calculated from the obtained height profile. The volume resistivity was calculated from the thickness and the current value and used as the volume resistivity of a matrix.

For the measurement positions, the thickness of the electro-conductive layer was denoted by T and measurement was performed at three arbitrary locations on the matrix portion in the thickness region from the outer surface of each piece to a depth of 0.1 T to 0.9 T, at a total of nine locations. The average value thereof was used as the volume resistivity of a matrix.

<3-2. Measurement of Volume Resistivity of Domain>

The volume resistivity of the domain was measured in the same manner as the method for measuring the volume resistivity of a matrix, except that the cantilever of the SPM was brought into contact with the location corresponding to the domain and the current value was measured.

<3-3. Measurement of Volume Resistivity of Conductive Layer>

A sample was cut out from the electro-conductive layer of the electro-conductive member I-1 in the same manner as described above. The volume resistivity of the sample was measured according to Japanese Industrial Standard (JIS) K 6911 (1995) using a measuring jig (apparatus name: MPC probe UR-SS: manufactured by Mitsubishi Chemical Analytic Corporation) and a high resistance measuring instrument (apparatus name: R8340A digital high resistance/microcurrent meter: manufactured by Advantest Corporation). Specifically, the volume resistivity was calculated from the current value when a voltage adjusted such that the electric field (applied voltage/measured sample) was 1000 V/cm was applied to the sample for 30 seconds.

<3-4. Measurement of Maximum Feret Diameter, Area, Perimeter, and Envelope Perimeter of Cross-Section of Domain and Number of Domains>

The maximum Feret diameter, area, perimeter, and envelope perimeter of the cross-section of the domain and the number of domains according to the present disclosure were measured as follows. First, a sample was cut out from the electro-conductive layer of an electro-conductive member 10 in the same manner as described above. The longitudinal length of the electro-conductive layer of the electro-conductive member I-1 was denoted by L and samples were cut out from the cross-section at a total of three locations perpendicular to the longitudinal direction at the center of the electro-conductive layer in the longitudinal direction and at positions L/4 from both ends of the electro-conductive layer toward the center. Platinum was deposited on the surfaces corresponding to the cross-sections in the thickness direction of the electro-conductive layer of the obtained sample. Next, using a scanning electron microscope (SEM) (product name: S-4800, manufactured by Hitachi High-Technologies Corporation), the platinum-deposited surfaces of the samples were imaged at a magnification of 5,000 times to obtain SEM images. Next, the SEM images were converted to 8-bit grayscale using the image-processing software "Image-Pro Plus" (product name, manufactured by Media Cybernetics, Inc.) to obtain a 256-gradation monochrome image. Next, the black and white of the image were subjected to an inversion process such that the domains in the monochrome image became white and a binarization threshold was set based on an algorithm of Otsu's discriminant analysis method for the luminance distribution of the image to obtain a binarized image. Next, for the obtained binarized image, the thickness of the electro-conductive layer was denoted by T, square observation regions with sides of 15 μm were placed at three arbitrary locations in the thickness region from the outer surface of each of the three pieces to a depth of 0.1 T to 0.9 T, and the maximum Feret diameter, area, perimeter, and envelope perimeter were calculated for each domain present in each of the observation regions, using the counting function of the above image-processing software described above.

The maximum Feret diameter, area, perimeter, and envelope perimeter measured for each of the domains observed in each observation region were used to calculate the value of $4 \times S/(\pi \times D_f^2)$ and the value of A/B. Then, among all of the observed domains, the number of domains (number %) which satisfied Requirement (2) (Equation (2)) described above was determined. In addition, the average value of the number of domains in each observation region was determined.

<3-5. Ratio of Cross-Sectional Area of Carbon Black Included in Domain with Respect to Cross-Sectional Area of Domain>

Using a scanning electron microscope (SEM) (product name: S-4800, manufactured by Hitachi High-Technologies Corporation), a location which corresponded to an observation region with sides of 15 μm placed on the binarized image in the evaluation of 3-4. described above, in the platinum-deposited surface of the sample created in 3-4. described above was imaged at a magnification of 20,000 times and an SEM image was obtained. Using an image analyzing apparatus (product name: LUZEX-AP, manufactured by Nireco Corporation), 8-bit grayscale conversion was performed on the SEM image to obtain a monochrome image with 256 gradations. Next, the black and white of the image were subjected to an inversion process such that the domains in the fracture surface became white and a binarization threshold was set based on an algorithm of Otsu's discriminant analysis method for the luminance distribution of the image to obtain a binarized image. Then, from the binarized image described above, an observation region of a size in which at least one domain was confined was extracted and the cross-sectional area of the domain and the cross-sectional area of the carbon black in the domain were calculated. From these results, the ratio (number %) of the number of domains satisfying Requirement (1) with respect to the number of all the observed domains was calculated. In addition, based on the results of 3-4. described above, the ratio (number %) of the number of domains satisfying Requirement (1) and Requirement (2) was calculated. Furthermore, the arithmetic mean value of the maximum Feret diameter was calculated for the domains satisfying Requirement (1) and Requirement (2).

4. Change in Electrical Resistance Value Before and After Applying Voltage

The produced conductive member I-1 was left to stand for 48 hours or more in a low-temperature and low-humidity environment at a temperature of 15° C. and a relative humidity of 10%. Under the same environment, crimping was crimped on a stainless-steel drum of 30 mm in outer diameter and a load of 500 g was applied to each of both ends of the support of the electro-conductive member I-1. In this state, the stainless-steel drum was rotated at a speed of 30 rpm/min, a voltage of 1000 V was applied between the support and the stainless-steel drum while the electro-conductive member I-1 was driven to rotate, and the current value flowing at that time was measured. From the current value, the electrical resistance value (Log R equivalent value, the same applies below) was calculated according to Ohm's law and set as an electrical resistance value 1 of the electro-conductive member I-1.

Thereafter, in a low-temperature and low-humidity environment, the electro-conductive member I-1 was crimped on a stainless-steel drum of 30 mm in outer diameter and a load of 500 g was applied to both ends of the support of the electro-conductive member I-1. In this state, the stainless-steel drum was rotated at a speed of 10 rpm/min and a current of 20 μA was passed between the support and the stainless-steel drum for 30 hours while the electro-conductive member I-1 was driven to rotate.

After passing the current, the electrical resistance value was calculated by measuring the current value of the electro-conductive member I-1 in the same manner as the electrical resistance value 1 and set as an electrical resistance value 2 of the electro-conductive member I-1. In addition, after measuring the electrical resistance value 2, the electro-conductive member I-1 was left to stand for 48 hours or more in a high-temperature and high-humidity environment at a temperature of 30° C. and relative humidity of 80%. Thereafter, the current value of the electro-conductive member I-1 was measured in the same manner and the electrical resistance value was calculated and set as an electrical resistance value 3 of the electro-conductive member I-1. The amount of change in the electrical resistance values of the electro-conductive member I-1 after the current passed for 30 hours and before passing the current (electrical resistance value 2−electrical resistance value 1) and the amount of change in the electrical resistance values due to environmental differences after the current passed for 30 hours (electrical resistance value 2−electrical resistance value 3) were determined and evaluated according to the criteria described below.

Rank A: The amount of change in the electrical resistance value is less than Log R1.3 for both Rank B: The larger amount of change in the electrical resistance value is Log R1.3 or more and less than Log R1.5

Rank C: The larger amount of change in the electrical resistance value is Log R1.5 or more and less than Log R1.7

Rank D: The larger amount of change in the electrical resistance value is Log R1.7 or more.

5. Image Evaluation

[5-1] Scattering Evaluation

The toner scattering in electrophotographic images when image formation was performed using conductive member I-1 as a transfer roller was evaluated as follows. First, a laser printer (product name: Laserjet M608dn, manufactured by HP) was prepared as an electrophotographic image forming apparatus. This electrophotographic image forming apparatus was modified such that a voltage could be applied to the transfer member from an external power source (product name: Model 615, manufactured by Trek Japan).

Next, the laser printer described above with the electro-conductive member I-1 installed as a transfer roller was left to stand for 48 hours in an environment with a temperature of 15° C. and 10% relative humidity. Subsequently, in the same environment, a transfer voltage was applied to the electro-conductive member I-1 from an external power source and a horizontal line image with 2 dots and 98 spaces was output. The transfer voltage value was set as follows. That is, the lower electrical resistance value of the electrical resistance value (electrical resistance value 1) in a low-temperature and low-humidity environment before passing the current and the electrical resistance value (electrical resistance value 3) in a high-temperature and high-humidity environment after the current passed for 30 hours, as measured in 4 above, as well as the electrical resistance value of the paper as the transfer material, were set as $1 \times 10^8 \Omega$ and the voltage value that made the transfer current value 10 μA was determined. This value was set as the transfer voltage value.

Here, when a sufficient electric charge is supplied from the transfer roller to the back surface of the paper (the surface on the opposite side to the toner image carrying surface of the paper), the developer transferred to the toner carrying surface of the paper is held by the electric charge. On the other hand, when the electric charge supplied from the transfer roller to the back surface of the paper is insufficient, the developers transferred to the toner image carrying surface of the paper scatter due to the repulsion of the electric charge between the developers. The degree of scattering was evaluated by the following method.

(Measurement of Scattering Amount)

A 2-dot, 98-space horizontal line image (a horizontal line image in which 2-dot wide horizontal lines extending in the direction perpendicular to the rotational direction of the electrophotographic photosensitive member are drawn at intervals of 98 dots in the rotational direction) was printed, nine arbitrary points separated by 100 μm from the horizontal lines on the paper after image formation were observed with an optical microscope at 500 times, the developer present in the 400 μm square observation regions was counted, and the number was set as the scattering amount and evaluated by the criteria described below. When the amount of scattering is 60 or less, a good image with little scattering can be obtained.

Rank A: The amount of scattering is 60 or less;
Rank B: The amount of scattering is 61 or more.

Examples I-2 to I-11

Conductive members I-2 to I-11 were produced in the same manner as in Example I-1 and evaluated in the same manner as in Example I-1, except that the material prescriptions were changed as shown in Table 3 to Table 4.

Example II-1

A rubber composition for an electro-conductive layer was prepared in the same manner as in Example I-1, except that the foaming agent in the material prescription (3) of the rubber composition was not added.

Next, a round bar with a total length of 252 mm and an outer diameter of 6 mm subjected to an electroless nickel plating process on the surface of free-cut steel was prepared. Using a roll coater, an adhesive (product name: Metaloc U-20, manufactured by Toyokagaku Kenkyusho Co., Ltd.) was applied to the entire circumference of the round bar in a range of 230 mm, excluding 11 mm at each of both end portions. In the present Example, the round bar to which the adhesive was applied was used as the electro-conductive support.

Next, a die with an inner diameter of 12.5 mm was attached to the tip of a crosshead extruder having a supply mechanism for the electro-conductive support and a discharging mechanism for the unvulcanized rubber roller, the temperature of the extruder and crosshead was set at 100° C., and the transport speed of the electro-conductive support was adjusted to 60 mm/sec. Under these conditions, the rubber composition for an electro-conductive layer was supplied by the extruder and the outer circumferential portion of the electro-conductive support was coated with the rubber composition for an electro-conductive layer in the crosshead to obtain an unvulcanized rubber roller.

Next, the unvulcanized rubber roller was introduced into a hot air vulcanization furnace at 170° C. and the unvulcanized rubber composition was vulcanized by heating for 60 minutes to obtain a roller with an electro-conductive layer formed on the outer circumferential portion of the electro-conductive support. Thereafter, both end portions of the electro-conductive layer were cut off by 10 mm each to make the longitudinal length of the electro-conductive layer 231 mm.

Finally, the surface of the electro-conductive layer was polished with a rotating grinding wheel. Due to this, an electro-conductive member II-1 was obtained with each diameter being 8.44 mm at each position at 90 mm from the central portion to both end portion sides and a diameter of 8.5 mm at the central portion. The obtained conductive member II-1 was evaluated regarding the change in electrical resistance value before and after the application of voltage as described above and evaluated regarding the scattering. In relation to the scattering evaluation, since the outer diameter of the support and the outer diameter of the roller of the electro-conductive member II-1 were different from those of the electro-conductive member I-1 in Example I-1, the spring length and the support receiving member were adjusted.

[5-2] Fogging Evaluation

In order to confirm the degree of unevenness of discharge when the electro-conductive member II-1 was used as a charging member, the following fogging evaluation was performed.

First, a laser printer (product name: Laserjet M608dn, manufactured by HP) was prepared as an electrophotographic image forming apparatus. This electrophotographic image forming apparatus was modified such that a voltage could be applied to the charging member and the developing member from an external power source (product name: Model 615, manufactured by Trek Japan).

Next, the electro-conductive member II-1, the modified electrophotographic image forming apparatus, and the process cartridge were left to stand for 48 hours in an environment with a temperature of 30° C. and a relative humidity of 80%. Next, the process cartridge in which the electro-conductive member II-1 was installed as the charging roller was loaded into the electrophotographic image forming apparatus. ADC voltage of −1700 V was applied to the electro-conductive support of the electro-conductive member II-1 from the external power source and a voltage was applied to the developing member from an external power source such that $V_{back}$ (the voltage obtained by dividing the voltage applied to the developing member from the surface potential of the photosensitive member) became −300 V so as to output a solid white image.

Since the developer in this electrophotographic image forming apparatus has a negative charge property, when a solid white image is output, fundamentally, the developer does not migrate onto the photosensitive member and paper. However, in a case where a positively charged developer is present, so-called inversion fogging is generated in which the positively charged developer migrates to the overcharged portion on the surface of the photosensitive member due to the locally strong discharge from the charging member. As a result, toner not originally present on a solid white image is present and so-called "fogging" is generated. This phenomenon is much more likely to occur in a case where $V_{back}$ is large, such as −300 V.

The electrophotographic image forming apparatus set up as described above was used to output a solid white image in an environment of a temperature of 30° C. and relative humidity of 80% and the amount of fogging was measured. The amount of fogging was measured by the method described below.

(Measurement of Fogging Amount on Paper)

Nine arbitrary points on the solid white image were observed under an optical microscope at 500 times, the number of black dots caused by toner particles present in a 400 μm square observation region was counted, and the number thereof was evaluated as the amount of fogging on paper using the following criteria.

Rank A: The amount of fogging on paper was 60 or less
Rank B: The amount of fogging on paper was 61 or more Examples II-2 to II-4

Conductive members II-2 to II-4 were produced in the same manner as in Example II-1 and subjected to the same evaluation as the electro-conductive member II-1 according to Example II-1, except that the material prescriptions were changed as shown in Table 5.

Comparative Example 1

A rubber composition C1 for comparison according to Japanese Patent Application Laid-Open No. 2002-3651 was produced as follows.

100 parts of ethylene-propylene-diene ternary copolymer (product name: EPT4045, manufactured by Mitsui Chemicals, Inc.) as a domain material, 10 parts of carbon black (product name: Ketjen Black EC600JD, manufactured by Ketjen Black International) as conductive particles, 30 parts of paraffin oil (product name: PW-380, manufactured by Idemitsu Kosan Co., Ltd.) as a softening agent, and 1 part of stearic acid as a processing aid were kneaded in a pressurized kneader to obtain a master batch C1. Next, 75 parts of epichlorohydrin-ethylene oxide-allyl glycidyl ether ternary copolymer (product name: Epichlomer CG, manufactured by Osaka Soda Co., Ltd.) as a matrix material, 1 part of stearic acid as a processing aid, 35.25 parts of the master batch C1, 2.5 parts of 2,5-dimethyl-2,5-di(t-butylperoxyl) hexyne (product name: Perhexa 25B-40, manufactured by NOF Corporation) as a vulcanization agent, and 1.5 parts of triallylisocyanurate (product name: TAIC-M60, manufactured by Nippon Kasei Co., Ltd.) as a cross-linking aid were mixed in an open roll to obtain the comparative rubber composition C1.

Using the comparative rubber composition C1, an electro-conductive member C-1 was obtained by the same manufacturing method as in Example II-1. The obtained conductive member C-1 was subjected to the same evaluation as the electro-conductive member II-1 according to Example II-1.

Comparative Example 2

An electro-conductive member C2 was obtained in the same manner as in Example I-1, except that the electrically conductive agent (C-1) was not added. The obtained conductive member C2 was subjected to the same evaluation as the electro-conductive member I-1 according to Example I-1.

The evaluation results of Examples I-1 to I-11, Examples II-1 to II-4, and Comparative Examples 1 and 2 are shown in Table 6 to Table 9. From the results of the Examples, it was confirmed that the electro-conductive member according to one aspect of the present disclosure is an electro-conductive member which can suppress high resistance caused by the degradation of carbon black. In addition, it was also confirmed that the electro-conductive member according to one aspect of the present disclosure can be used as a charging member which can suppress fogging even in a case where the charging bias is increased. Since Comparative Example 1 had no ion-conductive polymer in the domains, the resistivity was high when current passed at high voltage for a long time. In Comparative Example 2, there was no electrically conductive agent, only electro-conductivity due to the ion-conductive rubber, thus, the resistance changes due to the environment were large and the resistance changes became even larger when current passed for a long time.

TABLE 3

| Raw materials | | | Examples | | |
|---|---|---|---|---|---|
| | | | I-1 | I-2 | I-3 |
| Material prescription (1) | Second rubber | R2-1 | 30.0 | — | — |
| | | R2-2 | — | 30.0 | 20.0 |
| | Electrically conductive agent | C-1 | 25.0 | — | — |
| | | C-2 | — | 30.0 | — |
| | | C-3 | — | — | 11.0 |
| | Vulcanization aid No. 1 | | 1.5 | 1.5 | 1.0 |

TABLE 3-continued

| Raw materials | | | Examples | | |
|---|---|---|---|---|---|
| | | | I-1 | I-2 | I-3 |
| Material prescription (2) | First rubber | R1-1 | 70.0 | 70.0 | 80.0 |
| | | R1-2 | — | — | — |
| | | R1-3 | — | — | — |
| | Electrically conductive agent | C-1 | — | — | — |
| | Vulcanization aid No. 1 | | 3.5 | 3.5 | 4.0 |
| Material prescription (3) | Vulcanization agent No. 1 | | 3.0 | 3.0 | 3.0 |
| | Vulcanization accelerator No. 1 | | 2.0 | 2.0 | 2.0 |
| | Vulcanization accelerator No. 2 | | 1.5 | 1.5 | 1.5 |
| | Foaming agent No. 1 | | 2.5 | 2.5 | 2.5 |

TABLE 4

| Raw materials | | | Examples | | | | | | | | |
|---|---|---|---|---|---|---|---|---|---|---|---|
| | | | I-4 | I-5 | I-6 | I-7 | I-8 | I-9 | I-10 | I-11 |
| Material prescription (1) | Second rubber | R2-1 | 30.0 | 20.0 | 30.0 | — | — | 20.0 | 20.0 | 30.0 |
| | | R2-3 | — | — | — | — | 20.0 | — | — | — |
| | | R2-4 | — | — | — | 20.0 | — | — | — | — |
| | Electrically conductive agent | C-1 | 25.0 | — | — | — | — | — | — | 35.0 |
| | | C-4 | — | 2.0 | — | 2.0 | 2.0 | 2.0 | 4.0 | — |
| | | C-5 | — | — | 25.0 | — | — | — | — | — |
| | Vulcanization aid No. 1 | | 1.5 | 1.0 | 1.5 | 1.0 | 1.0 | 1.0 | 1.0 | 1.5 |
| Material prescription (2) | First rubber | R1-1 | — | — | 70.0 | 80.0 | 80.0 | 80.0 | 80.0 | — |
| | | R1-3 | — | 80.0 | — | — | — | — | — | 70.0 |
| | | R1-4 | 70.0 | — | — | — | — | — | — | — |
| | Electrically conductive agent C-1 | | — | — | — | — | — | 16.0 | — | — |
| | Vulcanization aid No. 1 | | 3.5 | 4.0 | 3.5 | 4.0 | 4.0 | 4.0 | 4.0 | 3.5 |
| Material prescription (3) | Vulcanization agent No. 1 | | 3.0 | 3.0 | 3.0 | 3.0 | 3.0 | 3.0 | 3.0 | 3.0 |
| | Vulcanization accelerator No. 1 | | 2.0 | 2.0 | 2.0 | 2.0 | 2.0 | 2.0 | 2.0 | 2.0 |
| | Vulcanization accelerator No. 2 | | 1.5 | 1.5 | 1.5 | 1.5 | 1.5 | 1.5 | 1.5 | 1.5 |
| | Foaming agent No. 1 | | 2.5 | 2.5 | 2.5 | 2.5 | 2.5 | 2.5 | 2.5 | 0 |

TABLE 5

| Raw materials | | | Examples | | | |
|---|---|---|---|---|---|---|
| | | | II-1 | II-2 | II-3 | II-4 |
| Material prescription (1) | Second rubber | R2-1 | 30.0 | 25.0 | 30.0 | 30.0 |
| | | R2-2 | — | — | — | — |
| | Electrically conductive agent | C-1 | 25.0 | 20.8 | 25.0 | 30.0 |
| | | C-2 | — | — | — | — |
| | | C-3 | — | — | — | — |
| | Vulcanization aid No. 1 | | 1.5 | 1.3 | 1.5 | 1.5 |
| Material prescription (2) | First rubber | R1-1 | 70 | — | — | — |
| | | R1-2 | — | 75.0 | — | — |
| | | R1-3 | — | — | 70.0 | 70.0 |
| | Electrically conductive agent C-1 | | — | — | — | — |
| | Vulcanization aid No. 1 | | 3.5 | 3.8 | 3.5 | 3.5 |
| Material prescription (3) | Vulcanization agent No. 1 | | 3.0 | 3.0 | 3.0 | 3.0 |
| | Vulcanization accelerator No. 1 | | 2.0 | 2.0 | 2.0 | 2.0 |
| | Vulcanization accelerator No. 2 | | 1.5 | 1.5 | 1.5 | 1.5 |
| | Foaming agent No. 1 | | 0.0 | 0.0 | 0.0 | 0.0 |

TABLE 6

| | | Examples | | |
|---|---|---|---|---|
| | | I-1 | I-2 | I-3 |
| Volume resistivity $\rho d$ of domain | ($\Omega \cdot cm$) | 2.5.E+02 | 3.5.E+02 | 1.2.E+02 |
| Volume resistivity $\rho$ of conductive layer | ($\Omega \cdot cm$) | 2.0.E+06 | 2.6.E+06 | 2.2.E+06 |
| Volume resistivity $\rho m$ of matrix | ($\Omega \cdot cm$) | 3.0.E+08 | 3.0.E+08 | 3.0.E+08 |
| CB ratio of cross-sectional area | (%) | 28% | 28% | 21% |
| Number of domains satisfying Requirement (1) | (number %) | 90% | 89% | 87% |
| Domain irregular shape (A/B) | | 1.05 | 1.04 | 1.08 |
| Number of domains satisfying Requirement (2) | (number %) | 90% | 89% | 89% |
| Number of domains satisfying Requirements (1) and (2) | (number %) | 89% | 89% | 87% |

TABLE 6-continued

|  |  | Examples | | |
|---|---|---|---|---|
|  |  | I-1 | I-2 | I-3 |
| Maximum Feret diameter of domain | (μm) | 1.10 | 1.60 | 1.50 |
| Average number of domains |  | 120 | 80 | 45 |
| Electric resistance value 1 |  | 6.17 | 6.00 | 6.45 |
| Electric resistance value 2 |  | 7.08 | 7.15 | 7.60 |
| Electric resistance value 3 |  | 6.00 | 5.90 | 6.40 |
| Electric resistance value 2 − Electric resistance value 1 |  | 1.08 | 1.25 | 1.20 |
| Electric resistance value 2 − Electric resistance value 3 |  | 0.91 | 1.15 | 1.15 |
| MAX − MIN |  | 1.08 | 1.25 | 1.20 |
| Electric current passing durability |  | A | A | A |
| Scattering evaluation |  | A | A | A |

TABLE 7

|  |  | Examples | | | | | | | |
|---|---|---|---|---|---|---|---|---|---|
|  |  | I-4 | I-5 | I-6 | I-7 | I-8 | I-9 | I-10 | I-11 |
| Volume resistivity ρd of domain | (Ω · cm) | 2.5.E+02 | 1.6.E+02 | 3.2.E+03 | 1.5.E+02 | 1.7.E+02 | 1.6.E+02 | 8.0.E+00 | 1.1.E+02 |
| Volume resistivity ρ of conductive layer | (Ω · cm) | 2.3.E+07 | 4.8.E+07 | 4.4.E+07 | 1.2.E+06 | 1.5.E+06 | 4.8.E+05 | 4.8.E+07 | 5.0.E+02 |
| Volume resistivity ρm of matrix | (Ω · cm) | 4.9.E+16 | 1.2.E+13 | 3.0.E+08 | 3.0.E+08 | 3.0.E+08 | 6.0.E+06 | 3.0.E+08 | 1.2.E+13 |
| CB ratio of cross-sectional area | (%) | 28% | 3% | — | 3% | 3% | 3% | 7% | 36% |
| Number of domains satisfying Requirement (1) | (number %) | 90% | 83% | — | 83% | 83% | 83% | 85% | 85% |
| Domain irregular shape (A/B) |  | 1.50 | 1.15 | 1.07 | 1.20 | 1.13 | 1.13 | 1.12 | 1.07 |
| Number of domains satisfying Requirement (2) | (number %) | 82% | 84% | 84% | 84% | 89% | 84% | 84% | 88% |
| Number of domains satisfying Requirements (1) and (2) | (number %) | 86% | 83% | — | 83% | 81% | 81% | 82% | 84% |
| Maximum Feret diameter of domain | (μm) | 8 | 3 | 2.8 | 2.5 | 1.3 | 3 | 3 | 1.8 |
| Average number of domains |  | 15 | 33 | 35 | 40 | 50 | 32 | 35 | 60 |
| Electric resistance value 1 |  | 7.66 | 7.10 | 7.05 | 6.12 | 6.20 | 5.31 | 5.11 | 5.01 |
| Electric resistance value 2 |  | 8.70 | 8.27 | 8.45 | 7.35 | 7.65 | 6.90 | 6.70 | 6.50 |
| Electric resistance value 3 |  | 7.70 | 6.90 | 7.20 | 5.96 | 6.05 | 6.65 | 6.10 | 6.10 |
| Electric resistance value 2 − Electric resistance value 1 |  | 1.00 | 1.37 | 1.25 | 1.39 | 1.60 | 0.25 | 0.60 | 1.49 |
| Electric resistance value 2 − Electric resistance value 3 |  | 1.04 | 1.17 | 1.40 | 1.23 | 1.45 | 1.59 | 1.59 | 0.40 |
| MAX−MIN |  | 1.04 | 1.37 | 1.40 | 1.39 | 1.60 | 1.59 | 1.59 | 1.49 |
| Electric current passing durability |  | A | B | B | B | C | C | C | B |
| Scattering evaluation |  | A | A | A | A | A | A | A | A |

TABLE 8

|  |  | Examples | | | |
|---|---|---|---|---|---|
|  |  | II-1 | II-2 | II-3 | II-4 |
| Volume resistivity ρd of domain | (Ω · cm) | 2.5.E+02 | 2.5.E+02 | 2.5.E+02 | 1.8.E+02 |
| Volume resistivity ρ of conductive layer | (Ω · cm) | 8.0.E+05 | 2.7.E+06 | 8.0.E+06 | 6.5.E+06 |
| Volume resistivity ρm of matrix | (Ω · cm) | 3.0.E+08 | 2.7.E+08 | 1.2.E+13 | 1.2.E+13 |
| CB ratio of cross-sectional area | (%) | 28% | 28% | 28% | 32% |
| Number of domains satisfying Requirement (1) | (number %) | 90% | 90% | 90% | 87% |
| Domain irregular shape (A/B) |  | 1.05 | 1.03 | 1.07 | 1.07 |
| Number of domains satisfying Requirement (2) | (number %) | 90% | 92% | 88% | 88% |
| Number of domains satisfying Requirements (1) and (2) | (number %) | 89% | 90% | 87% | 87% |
| Maximum Feret diameter of domain | (μm) | 1.10 | 0.90 | 1.80 | 1.80 |
| Average number of domains |  | 120 | 140 | 60 | 60 |
| Electric resistance value 1 |  | 5.74 | 6.31 | 6.72 | 6.51 |
| Electric resistance value 2 |  | 6.44 | 7.28 | 7.80 | 7.78 |
| Electric resistance value 3 |  | 5.52 | 6.11 | 6.61 | 6.45 |
| Electric resistance value 2 − Electric resistance value 1 |  | 0.92 | 1.17 | 1.19 | 1.27 |
| Electric resistance value 2 − Electric resistance value 3 |  | 0.70 | 0.97 | 1.08 | 0.97 |
| MAX − MIN |  | 0.92 | 1.17 | 1.19 | 1.27 |
| Electric current passing durability |  | A | A | A | A |
| Scattering evaluation |  | A | A | A | A |
| Fogging evaluation |  | A | A | A | A |

TABLE 9

|  |  | Comparative Example 1 | Comparative Example 2 |
|---|---|---|---|
| Volume resistivity ρd of domain | (Ω·cm) | 3.5.E+03 | 8.0.E+06 |
| Volume resistivity ρ of conductive layer | (Ω·cm) | 3.3.E+05 | 3.2.E+07 |
| Volume resistivity ρm of matrix | (Ω·cm) | 1.4.E+07 | 3.0.E+08 |
| CB ratio of cross-sectional area | (%) | 3% | — |
| Number of domains satisfying Requirement (1) | (number %) | 75% | — |
| Domain irregular shape (A/B) |  | 1.10 | 1.23 |
| Number of domains satisfying Requirement (2) | (number %) | 72% | 65% |
| Number of domains satisfying Requirement (1) and (2) | (number %) | 71% | — |
| Maximum Feret diameter of domain | (μm) | 7 | 1.6 |
| Average number of domains |  | 25 | 65 |
| Electric resistance value 1 |  | 5.90 | 8.32 |
| Electric resistance value 2 |  | 7.72 | 8.81 |
| Electric resistance value 3 |  | 7.61 | 6.77 |
| Electric resistance value 2 − Electric resistance value 1 |  | 0.11 | 2.04 |
| Electric resistance value 2 − Electric resistance value 3 |  | 1.82 | 0.49 |
| MAX − MIN |  | 1.82 | 2.04 |
| Electric current passing durability |  | D | D |
| Scattering evaluation |  | B | B |
| Fogging evaluation |  | B | — |

According to one aspect of the present disclosure, an electro-conductive member in which the change in resistance value is small even when transmitting a large current at a high voltage for a long period of time can be obtained. In addition, according to another aspect of the present disclosure, a process cartridge which contributes to the formation of high quality electrophotographic images can be obtained. Furthermore, according to still another aspect of the present disclosure, an electrophotographic image forming apparatus which can form high quality electrophotographic images can be obtained.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An electrophotographic electro-conductive member, comprising:
    a support having an electro-conductive outer surface; and
    an electro-conductive layer on the outer surface of the support, the electro-conductive layer comprising a matrix including a cross-linked product of a first rubber, and domains dispersed in the matrix;
    the domains comprising a cross-linked product of a second rubber different from the first rubber and carbon black; and
    the cross-linked product of the second rubber comprising, in a molecule, a structural unit represented by formula (I)
    [—(CH$_2$)$_n$—O—] (I), where n is an integer of 1 to 3, wherein
    when L is a longitudinal direction length of the electro-conductive layer is denoted and T is a thickness of the electro-conductive layer is denoted, for each cross-section of the electro-conductive layer in a thickness direction at three locations of a center of the electro-conductive layer in a longitudinal direction and L/4 from both ends toward the center of the electro-conductive layer, and
    when 15 μm square observation regions are placed at three arbitrary locations in a thickness region from an outer surface of the electro-conductive layer to a depth of 0.1-0.9 T, at least 80% of the number of the domains observed in each of the total of nine observation regions satisfy (1) and (2)
    (1) a ratio of a cross-sectional area of the carbon black included in the domain with respect to a cross-sectional area of the domain is at least 20%, and
    (2) A/B is 1.00 or more to 1.10 or less when A is a perimeter of the domain and B is an envelope perimeter of the domain.

2. The electrophotographic electro-conductive member according to claim 1, wherein ρd is $1.0 \times 10^1$ to $1.0 \times 10^4$ Ω·cm and ρ is $1.0 \times 10^5$ to $1.0 \times 10^8$ Ω·cm when ρd is a volume resistivity of the domain and ρ is a volume resistivity of the electro-conductive layer.

3. The electrophotographic electro-conductive member according to claim 1, wherein a volume resistivity μm of the matrix is $1.0 \times 10^8$ to $1.0 \times 10^{17}$ Ω·cm.

4. The electrophotographic electro-conductive member according to claim 1, wherein the cross-linked product of the second rubber comprises a structural unit derived from allyl glycidyl ether.

5. The electrophotographic electro-conductive member according to claim 1, wherein the cross-linked product of the second rubber is a cross-linked product of an epichlorohydrin-alkylene oxide-allyl glycidyl ether ternary copolymer.

6. The electrophotographic electro-conductive member according to claim 1, wherein the structural unit represented by formula (I) comprises at least one of an ethylene oxide structural unit and a propylene oxide structural unit.

7. The electrophotographic electro-conductive member according to claim 1, wherein a DBP absorption amount of the carbon black is 40 to 200 cm$^3$/100 g.

8. The electrophotographic electro-conductive member according to claim 1, wherein an average of a maximum Feret diameter D$_f$ of the domains included in each of the domains satisfying (1) and (2) is in a range of 0.1 to 5.0 μm.

9. The electrophotographic electro-conductive member according to claim 1, wherein an average number of the domains present in the observation regions is 20 to 300.

10. The electrophotographic electro-conductive member according to claim 1, wherein a ratio of a cross-sectional area of the carbon black with respect to a cross-sectional area of the domains is 30% or less.

11. The electrophotographic electro-conductive member according to claim 1, wherein the first rubber is acrylonitrile-butadiene rubber.

12. The electrophotographic electro-conductive member according to claim 11, wherein an acrylonitrile content ratio in the cross-linked product of the first rubber is 15 to 25% by mass.

13. The electrophotographic electro-conductive member according to claim 1, wherein the electro-conductive member has a roller shape.

14. The electrophotographic electro-conductive member according to claim 1, wherein the electro-conductive member is a transfer member.

15. An electrophotographic image forming apparatus comprising an electrophotographic electro-conductive member, the electrophotographic electro-conductive member comprising:

a support having an electro-conductive outer surface; and
an electro-conductive layer on the outer surface of the support, the electro-conductive layer comprising a matrix including a cross-linked product of a first rubber, and domains dispersed in the matrix;
the domains comprising a cross-linked product of a second rubber different from the first rubber and carbon black; and
the cross-linked product of the second rubber comprising, in a molecule, a structural unit represented by formula (I)
[—$(CH_2)_n$—O—] (I), where n is an integer of 1 to 3, wherein
when L is a longitudinal direction length of the electro-conductive layer is denoted and T is a thickness of the electro-conductive layer is denoted, for each cross-section of the electro-conductive layer in a thickness direction at three locations of a center of the electro-conductive layer in a longitudinal direction and L/4 from both ends toward the center of the electro-conductive layer, and
when 15 μm square observation regions are placed at three arbitrary locations in a thickness region from an outer surface of the electro-conductive layer to a depth of 0.1-0.9 T, at least 80% of the number of the domains observed in each of the total of nine observation regions satisfy (1) and (2)
(1) a ratio of a cross-sectional area of the carbon black included in the domain with respect to a cross-sectional area of the domain is at least 20%, and
(2) A/B is 1.00 or more to 1.10 or less when A is a perimeter of the domain and B is an envelope perimeter of the domain.

16. The electrophotographic image forming apparatus according to claim 15, wherein the electro-conductive member is configured to function as a transfer member.

17. An electrophotographic process cartridge which is attachable to and detachable from a main body of an electrophotographic image forming apparatus, comprising an electro-conductive member, the electro-conductive member comprising:

a support having an electro-conductive outer surface; and
an electro-conductive layer on the outer surface of the support, the electro-conductive layer comprising a matrix including a cross-linked product of a first rubber, and domains dispersed in the matrix;
the domains comprising a cross-linked product of a second rubber different from the first rubber and carbon black; and
the cross-linked product of the second rubber comprising, in a molecule, a structural unit represented by formula (I)
[—$(CH_2)_n$—O—] (I), where n is an integer of 1 to 3, wherein
when L is a longitudinal direction length of the electro-conductive layer is denoted and T is a thickness of the electro-conductive layer is denoted, for each cross-section of the electro-conductive layer in a thickness direction at three locations of a center of the electro-conductive layer in a longitudinal direction and L/4 from both ends toward the center of the electro-conductive layer, and
when 15 μm square observation regions are placed at three arbitrary locations in a thickness region from an outer surface of the electro-conductive layer to a depth of 0.1-0.9 T, at least 80% of the number of the domains observed in each of the total of nine observation regions satisfy (1) and (2)
(1) a ratio of a cross-sectional area of the carbon black included in the domain with respect to a cross-sectional area of the domain is at least 20%, and
(2) A/B is 1.00 or more to 1.10 or less when A is a perimeter of the domain and B is an envelope perimeter of the domain.

* * * * *